UNITED STATES PATENT OFFICE.

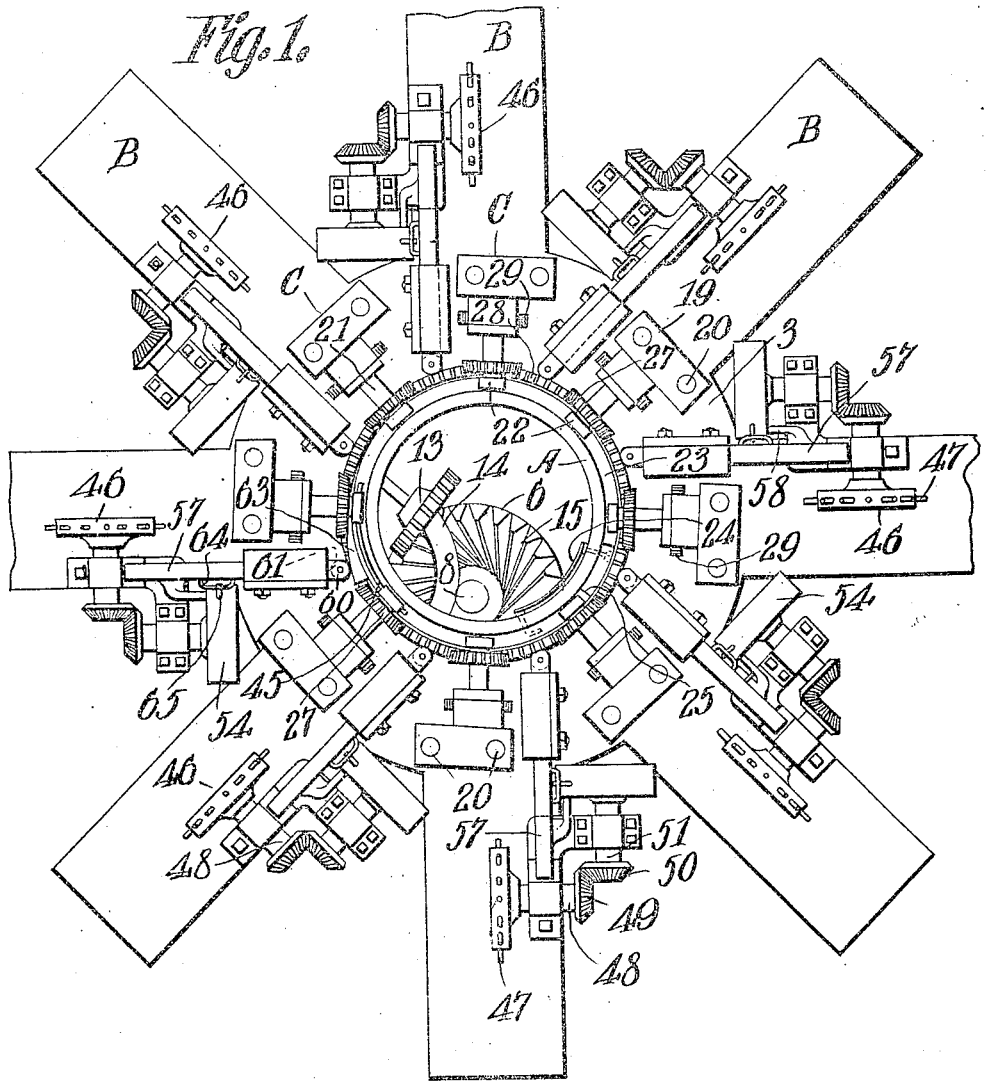

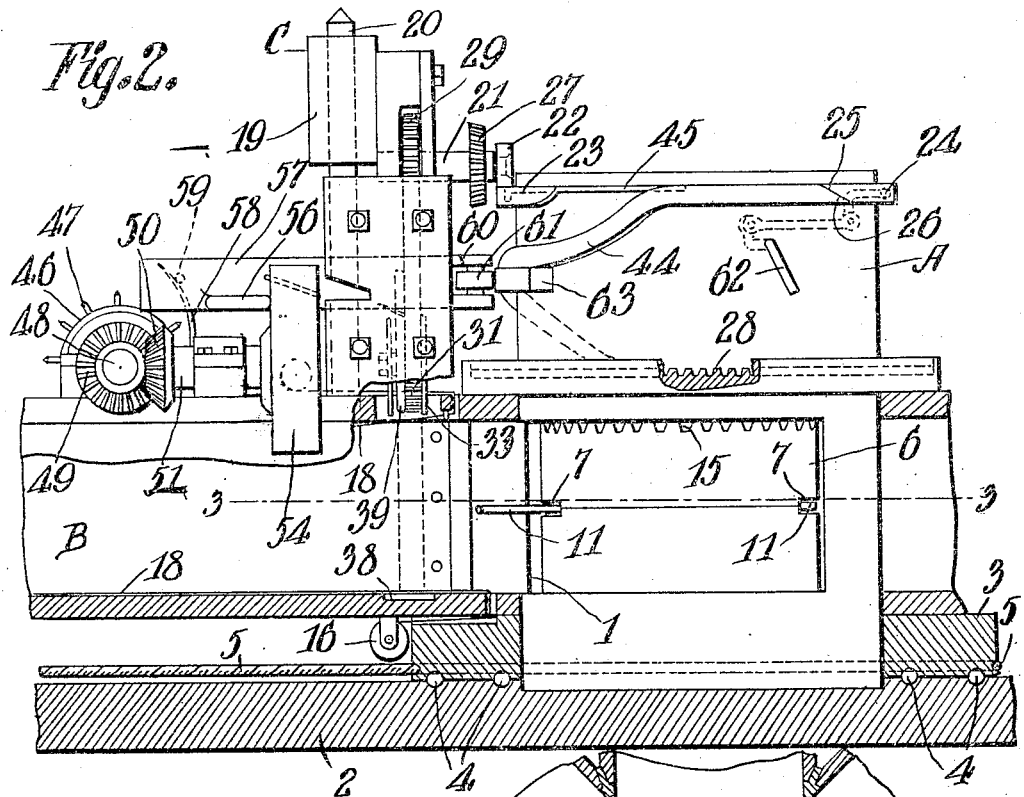

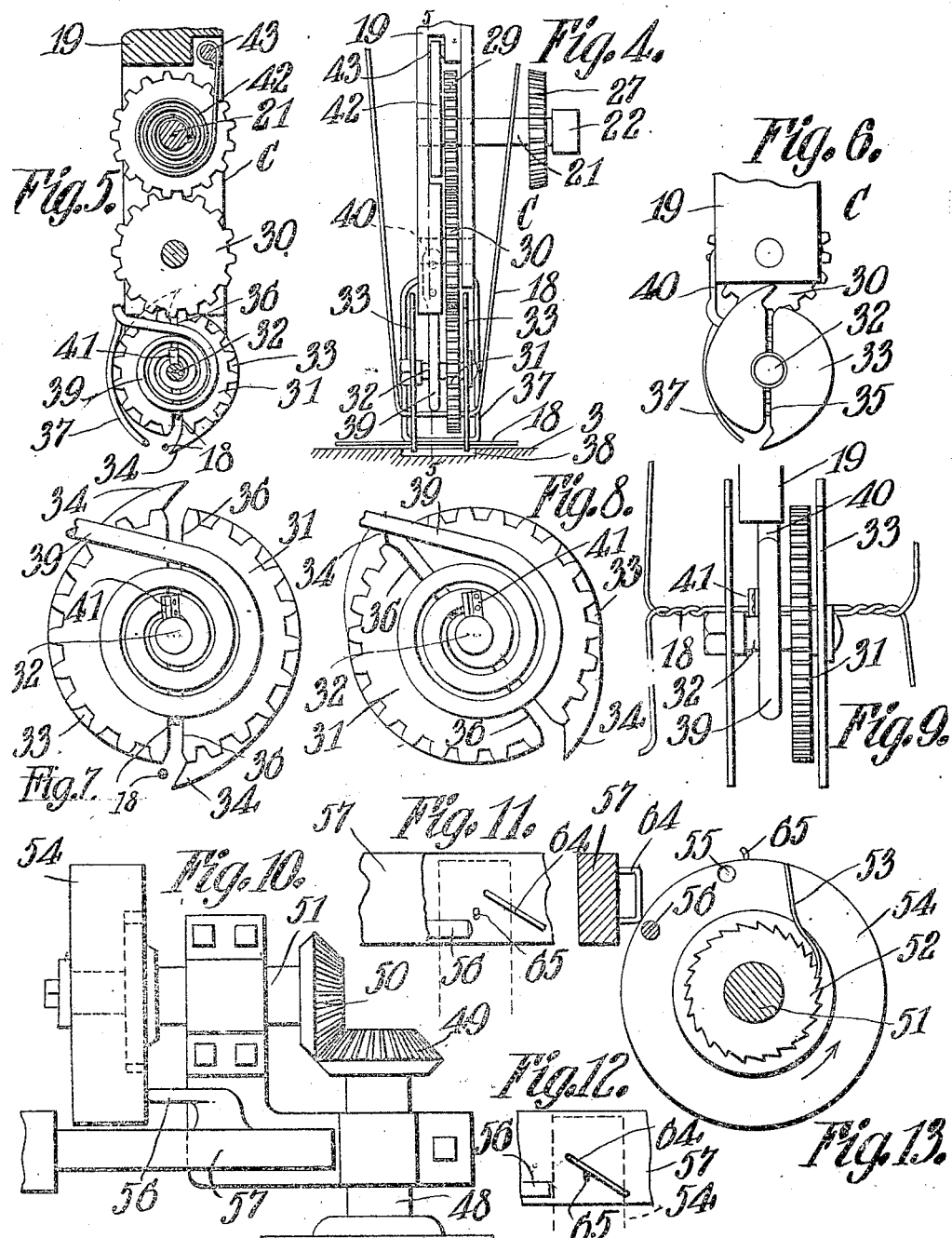

WILLIAM SILOUS BRYAN, OF DECATUR, TEXAS, ASSIGNOR OF ONE-SIXTH TO W. S. BARLOW, OF GAINESVILLE, TEXAS.

BALING-MACHINE.

No. 875,652.

Specification of Letters Patent.

Patented Dec. 31, 1907.

Application filed September 15, 1906. Serial No. 334,711.

*To all whom it may concern:*

Be it known that I, WILLIAM SILOUS BRYAN, a citizen of the United States, residing at Decatur, in the county of Wise and State of Texas, have invented a new and useful Baling-Machine, of which the following is a specification.

This invention relates to baling machines such as are intended particularly for handling hay and other material which is to be formed into bales.

The objects of the invention are to improve and simplify the construction of such machines; furthermore, to increase their efficiency in operation and to decrease the expense attending their manufacture.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of the following claims without departing from the spirit of the invention or sacrificing any of its advantages.

In the accompanying drawings forming part of this specification:—Figure 1 is a plan view of a baling machine constructed in accordance with the invention, showing the centrally disposed feed hopper and the radial baling chambers; Fig. 2 is a side elevation, partly in section, showing the feed hopper and one of the baling chambers; Fig. 3 is a horizontal section on the line 3—3 of Fig. 2; Fig. 4 is a side elevation of a portion of the twisting and cutting mechanism; Fig. 5 is a section on the line 5—5 of Fig. 4; Fig. 6 is a front elevation of a portion of the twisting and cutting mechanism; Figs. 7, 8 and 9 are enlarged detail views of portions of the twisting and cutting mechanism; Fig. 10 is a plan view of the controlling mechanism for the twisting and cutting mechanism; Figs. 11 and 12 are enlarged detail views, showing the means for retracting the longitudinal bar of the controlling mechanism; and Fig. 13 is a detail view, partly in section, of the controlling disk.

Like reference numerals indicate corresponding parts in the different figures of the drawings.

It may be briefly premised that the baling machine of the present invention is constructed with a centrally-disposed feed hopper into which the hay or other material is fed; a plurality of baling chambers radially disposed with respect to said feed hopper and adapted to receive the material fed from the lower end of said hopper; means for producing relative rotary movement between said feed hopper and baling chambers; means for moving the material in said feed hopper radially outward into said baling chambers; and means located in each of said baling chambers for automatically binding with wire a bale of material and cutting the wires thereof when the bale has grown to sufficient size.

The reference letter A indicates the centrally-disposed feed hopper which is in the nature of a large pipe having at its lower end an outlet 1, as shown clearly in Fig. 3. The feed hopper A is connected in any suitable manner with a stationary base 2. Mounted for rotary movement upon the stationary base 2 around the feed hopper A is an annular frame 3 with which is connected in any suitable manner a plurality of baling chambers B which are radially disposed with respect to the feed hopper A. For the purpose of facilitating the rotary movement of the annular frame 3 and the radial baling chambers B with respect to the hopper A, a plurality of sets of anti-friction rollers 4 are interposed between said frame and base.

The means for rotating the annular frame 3 and the baling chambers carried thereby, preferably consists of a flexible element or belt 5 which extends around the annular frame 3, and is operated from any suitable source of power. It will be understood that as the radial baling chambers B are rotated slowly around the feed hopper A, the material is fed outward through the outlet 1 in any suitable manner into the particular baling chamber B which happens to be disposed in front of the outlet 1. As the baling chambers B are continuously moving, a new baling chamber is constantly disposed in front of the outlet 1, for which reason a plurality of bales of material are formed at practically the same time in all the different baling chambers, each of said chambers receiving an additional supply of material each time it passes the outlet 1 during the rotation of the frame 3.

The means for feeding the material in the lower end of the feed hopper A outward into the radial baling chambers, preferably consists of a rotary annular feed member or turret 6 in the form of a hollow disk having slots 7 in its periphery. The turret 6 preferably is eccentrically disposed with respect to the center of the hopper A, as shown in Fig. 3, and is held in proper position by means of a stationary vertical shaft 8 which extends loosely through the center of the turret 6 and acts as a bearing for said turret during its rotary movement. Fixed rigidly upon the stationary shaft 8 within the turret 6 is a disk or annular supporting member 9 which is eccentrically disposed with respect to the turret 6. Loosely surrounding the periphery of the stationary disk or supporting member 9 is a metallic band or collar 10 with which is connected a pair of oppositely-disposed rotary feeding arms 11 which preferably are curved, as shown, the feed arms 11 projecting outwardly into the slots 7 of the turret 6, so that as said turret is rotated in any suitable manner around the stationary shaft 8 in the direction of the arrow in Fig. 3, the arms 11, by engaging the rear ends of one or the other of the peripheral slots 7, will be rotated upon the disk or stationary supporting member 9. The eccentric arrangement of the disk 9 with respect to the turret 6 causes the feed arm 11 at the right side of Fig. 3 to project itself gradually outward from the slot 7 of the turret 6 so as to gather up a quantity of material in the lower end of the hopper at one side of the turret 6, and to move the same outward through the outlet 1 into one of the baling chambers B. During this movement of the right feed arm, the left feed arm in Fig. 3 is gradually drawing into its slot 7 so as not to project beyond the outer periphery of the turret 6 far enough to contact with the inner ends of the baling chambers. For the purpose of preventing wisps of hay or similar material from being disposed partly in one of the baling chambers B and partly in the next adjacent chamber, said baling chambers are separated from each other by means of knives 12 which are located at the meeting inner ends of said baling chamber.

The turret 6 is eccentrically disposed with respect to the center of the feed hopper A in such manner that the portion of its periphery farthest from the center of the feed hopper A, that is, the portion of said turret shown at the bottom of Fig. 3, will just graze the sharp inner ends of the knives 12 during the rotation of the baling chambers with respect to the feed hopper. For this reason the turret 6 will press any wisps of hay or other material, which may be disposed partly in one baling chamber and partly in another, up against the knives 12 and cause the same to be severed so that there will be no connection between the material in one baling chamber and the material in the next adjacent chamber. Further-more, it will be obvious that while the feed arms 11 throw the material outward from the lower end of the feed hopper A on to the upper surface of the annular frame 3, the rotary movement of said annular frame 3 together with the baling chambers B in the direction of the arrow in Fig. 3, will cause the material which has been fed outward on to said annular frame by the arms 11 to contact with the turret 6 which is rotating in the direction of the arrow, and will consequently force said material outward into the baling chambers B, at the same time causing the material to be properly cut by the knives 12 as they pass close to the periphery of the turret 6, as described. The means for rotating the turret 6 in the direction of the arrow preferably consists of a gear wheel 13 mounted on a curved supporting arm or brace 14, as shown in Fig. 1, so as to be in mesh with the gear teeth 15 formed on the upper surface of the turret. 6 The gear wheel 13 is rotated in any suitable manner, as by means of a belt extending downward into the hopper A and suitably shielded so as not to become entangled with the material fed into said hopper.

Each of the baling chambers B preferably is in the nature of a rectangular box having its inner and outer ends open so that, after one bale has been formed and bound in the manner hereafter described, the material for the next bale, which was fed into the inner end of each baling chamber, will contact with the rear end of the first mentioned bale and will push the same gradually outward in the radial baling chamber until it is discharged from the outer end thereof. At the same time the presence of the first mentioned bale which has been formed and banded, acts as a retarding means for causing the proper packing of the material which is fed into each baling chamber for forming the next bale.

For the purpose of placing a tie wire around each bale from end to end thereof during the operation of the machine, each baling chamber B is provided with a lower wire reel 16 and an upper wire reel 17. The wire 18 from each of the reels 16 and 17 passes around the inner edge of each baling chamber and then radially outward, as shown in Fig. 2, so that the wire from the upper reel 17 is disposed between the upper end of the bale and the top of the baling chamber, and the wire from the lower reel 16 passes along between the bottom of the bale and the bottom of the baling chamber. When the machine is first started the wires 18 from the two reels 16 and 17 are twisted or knotted together so that as the material is fed gradually outward in the baling chamber it carries the wire with it and causes the same gradually to unwind from the reels.

The mechanism for intertwisting the wires from the two reels 16 and 17 and for cutting the same when the bale has been extended to the proper length, is indicated generally by the reference letter C and consists of a supporting frame 19 which is mounted for vertical movement upon a pair of standards or guides 20 mounted on each of the baling chambers. Suitably journaled upon the supporting frame 19 is an operating shaft 21 which is provided at its outer end with an idle roller 22. The idle roller 22 rests normally upon an annular supporting track 23 which extends around the upper end of the circular feed hopper A. As long as the idle roller 22 is in engagement with the supporting track 23, the frame 19 of the tying and cutting mechanism is held in raised position so that its lower end is raised above the baling chambers. The supporting track 23 is provided at one point with what shall be termed a descending switch 24 in that its function when raised in the manner hereinafter described is to permit the idle roller 22 to move down the beveled end 25 of the track 23, thus permitting the lower end of the twisting and cutting mechanism to move downward into contact with the bale of material in the baling chamber. For the purpose of forcing the twisting and cutting mechanism downward past the bale so that its lower end can engage the two wires and twist the same together, the idle roller 22, after it passes down through the descending switch 24, engages the under side of a descending track 26 which is in the nature of a downwardly inclined cam member connected with the stationary hopper A, so that as the baling chamber containing the frame 19 on which the operating shaft 21 is journaled moves around the hopper A, the idle roller 22 will roll down the under surface of the descending track 26 and will consequently force the frame 19 downward between the bale and the hopper. When the idle roller 22 reaches the lower end of the descending track 26, a gear wheel 27, fixed on the operating shaft 21 of the frame 19, will move into mesh with an annular rack 28 which is fixed upon the stationary hopper A, as shown. The rotary movement of the baling chamber will cause the gear wheel 27 to rotate the operating shaft 21. The rotation of the operating shaft 21 will be transmitted through the gear wheels 29 and 30 to a gear wheel 31 which is fixed upon a shaft 32 at the lower end of the vertically-movable frame 19.

Mounted rigidly on the shaft 32, on opposite sides of the gear wheel 31, is a pair of twisting disks 33—33, as shown in Figs. 6 to 8 inclusive. Each of the disks 33 is provided with a pair of oppositely-disposed peripheral prongs 34. Adjacent each of the prongs 34, the disks 33 are formed with radially-extending slots 35, the gear wheel 31 being also formed with radial slots 36 to correspond with the slots of the twisting disks 33. Adjacent the twisting disks 33, the vertically-movable frame 19 is provided with a deflector 37 in the nature of a loop of wire which, as the frame 19 descends, is adapted to cause the upper tie wire 18 to move upward in the space between the deflector 37 and the twisting disks 33. It will be understood that after the descending switch 24 has been opened in the manner hereinafter described and the roller 22 has moved down the lower face of the descending track 26, the upper tie wire 18 is engaged between the deflector 37 and the twisting disks 33. When the gear wheel 27 engages the stationary annular rack 28, the twisting disks 33 are rotated so as to engage the lower tie wire 18 at the point where it crosses a cut away portion or depression 38 in the bottom of the baling chamber. The two wires are then twisted together as shown in Fig. 9.

The means for cutting the tie wires 18 preferably consists of a volute guide 39, the end 40 of which is extended upward and suitably connected with the frame 19. As the twisting disks 33 are rotated, the twisted portions of the two tie wires move in between the different convolutions of the volute guide 39 until they reach the inner end of said guide where they are moved into contact with a knife 41 which effectually severs the banding wires, leaving the rear end of one bale tied and also producing the proper connection between the band wires 18 for the forward end of the next bale which is to be formed. As soon as the band wires 18 have been properly twisted together and cut, a volute spring 42, shown at the upper end of Fig. 5, which is connected at its outer end with a pin 43 and at its inner end with the operating shaft 21, serves to rotate said shaft in a reverse direction to restore the twisting disks to the proper position for the next operation, it being understood that the spring 42 is placed under tension when the operating shaft 21 is rotated by the gear wheel 27, and it being understood further that the spring 42 does not act until the gear wheel 27 is raised out of engagement with the rack 28 by reason of the fact that the idle roller 22 is moved into engagement with the lower end of an ascending track or cam member 44 mounted upon the stationary hopper A. The rotation of the baling chambers with respect to the hopper A causes the idle roller 22 to move up the ascending track 44 until it passes under and raises an ascending switch 45 in the nature of a resilient rod adapted to yield upwardly when engaged by the roller 22.

Having thus described the manner in which the frame 19 carrying the twisting and cutting mechanism is moved downward and upward for the purpose of joining the wires 18, the mechanism for opening the descend- ing switch 24 and thus causing the operation of the twisting and cutting mechanism will now be described. Suitably journaled upon each of the baling chambers B is a pin wheel 46, the radial pins 47 of which are adapted to project downward through a suitable slot in the top of the baling chamber so as to be in position to be engaged by the bale of hay as it is gradually moved outward, the object of the pin wheel 46 being to cause the operation of the twisting mechanism when the bale has grown to the proper length. Mounted upon the shaft 48 of the pin wheel 46 is a bevel gear 49 which is in mesh with a bevel gear 50 upon a shaft 51, as shown in Fig. 10. The shaft 51 is provided with a ratchet wheel 52 which is adapted to be engaged by a spring pawl 53 upon a controlling disk 54. The ratchet mechanism described causes the controlling disk 54 to rotate with the shaft 51, and at the same time it permits said controlling disk to be rotated loosely in a forward direction whenever desired. The controlling disk 54 is formed in one side with a socket or depression 55 which is adapted at one point in the rotation of the controlling disk 54 to receive a finger 56 upon an endwise-movable bar 57 which is mounted in suitable guides upon the baling chamber. When the outward movement of the bale has operated the pin wheel 46 sufficiently to rotate the controlling disk 54 until the socket 55 is in line with the finger 56, a spring 58 which, as shown in Fig. 2, is suitably mounted upon the baling chamber and bears against a pin 59 on the bar 57, throws said bar forward so that the finger 56 enters the socket 55 and the forward end 60 of the bar 57 is moved close against the outer periphery of the feed hopper A, said forward end being provided with an anti-friction roller 61, as shown in Figs. 1 and 2. As the baling chamber rotates with the forward end 60 of the bar 57 close to the feed hopper A, said forward end 60 engages and rocks a lever 62 which, as shown by the dotted lines in Fig. 2, is connected in any suitable manner with the descending switch 24 so as to raise the same and thus permit the idle roller 22 which controls the twisting and cutting mechanism to roll downward against the under side of the descending track and thus throw the twisting and cutting mechanism into operation. As the baling chambers continue to rotate, the roller 61 of the endwise-movable bar 57 engages or rolls over a projection 63 connected with the ascending track 44. The engagement of the roller 61 with the projection 63, as shown in Fig. 2, serves to throw the bar 57 backwards so that the finger 56 leaves the socket or depression 55. The projection 63 throws the bar 57 rearwardly for a greater distance than is necessary to withdraw the finger 56 from the socket 55. This continued movement of the bar 57 after the finger 56 has left the socket 55 causes an inclined cam member or wire yoke 64 on the bar 57 to contact with a curved pin 65 extending outward from the periphery of the controlling disk 54 and thus move said disk forward a sufficient distance to carry the socket 55 out of line with the finger 56 so that when the roller 61 moves out of contact with the projection 63, the finger 56 will move into contact with the controlling disk 54 and will thereby serve to hold the bar 57 in its rearmost position until a sufficient length of bale has been fed outward in the baling chamber to rotate the pin wheel 46 and thus cause the descending switch 24 to be again thrown into operation for the purpose of permitting the operation of the twisting and cutting mechanism.

If it should be desired to throw the twisting and cutting mechanism into operation before the movement of the material through the baling chamber has caused the pin wheel 46 to rotate the controlling disk 54 until the finger 56 enters the socket 55, said controlling disk can be moved forward by hand until the finger 56 enters the socket or depression 55, this forward movement of the controlling disk 54 being permitted by the spring pawl 53 wiping idly over the ratchet wheel 52 of the controlling disk. In this way a comparatively short bale of material can be made in each of the baling chambers whenever desired.

The baling machine of the present invention is extremely strong, simple, durable and inexpensive in construction, as well as thoroughly efficient in operation. Furthermore, it is adapted to produce a large number of bales of material in a practically continuous manner for the reason that the operation of each baling chamber is practically independent of the operation of the other baling chambers. It will be understood also that the twisting and cutting mechanism of each baling chamber is automatically controlled by the length of the bale of material which has been formed in said chamber; in other words, the twisting and cutting mechanism will not be operated until the proper time whether the feed of material to the baling chamber be fast or slow.

If desired, a suitable wheel may be used for packing the material into the turret should it be deemed advisable to supply material to the machine by hand. Coil springs may be attached to the wheels 46 so as to prevent the wheels from tearing through the hay should considerable resistance be offered to their rotation.

What is claimed is:—

1. A baling machine having a centrally disposed feed hopper, and a plurality of baling chambers radiating therefrom, said feed hopper and baling chambers having a relative rotary movement with respect to each other.

2. A baling machine having a centrally disposed feed hopper, a plurality of radial baling chambers, and means for producing relative rotary movement between said hopper and baling chambers.

3. A baling machine having a feed hopper, a radial baling chamber, means for producing relative rotary movement between said hopper and baling chamber, twisting and cutting mechanism connected with said baling chamber, a supporting track carried by said feed hopper and having a connection with said twisting and cutting mechanism, upward and downward switches connected with said supporting track, upward and downward tracks connected with said feed hopper, and means for automatically opening said downward switch for throwing said twisting and cutting mechanism into contact with said downward track when a bale inside the baling chamber has reached the proper size.

4. A baling machine having a feed hopper, a radial baling chamber, means for producing relative rotary movement between said feed hopper and said baling chamber, twisting and cutting mechanism connected with said baling chamber, and cam tracks carried by said feed hopper for throwing said twisting and cutting mechanism into and out of operation.

5. A baling machine having a feed hopper, a plurality of baling chambers, means for producing relative rotary movement between said baling chambers and feed hopper, twisting and cutting mechanism connected with each of said baling chambers, and cam tracks connected with said feed hopper for moving said twisting and cutting mechanism into and out of said baling chambers.

6. A baling machine having a centrally disposed feed hopper and a plurality of radially-disposed baling chambers having a relative rotary movement with respect to the feed hopper, and mechanism for continuously feeding material from said feed hopper to said baling chambers.

7. A baling machine having a centrally disposed feed hopper, a plurality of radial baling chambers, means for producing relative rotary movement between said baling chambers and feed hopper, and revoluble mechanism for continuously feeding material from said feed hopper to said baling chambers.

8. A baling machine having a feed hopper, a plurality of radial baling chambers, means for producing relative rotary movement between said baling chambers and feed hopper, and rotary feed arms mounted in said hopper for feeding material to said baling chambers.

9. A baling machine having an annular feed hopper formed with an outlet, a radial baling chamber, a slotted rotary turret eccentrically mounted in said feed hopper, and feed arms eccentrically mounted within said turret and adapted to project through the slots thereof for feeding material through said outlet into said baling chamber.

10. A baling machine having a feed hopper, a plurality of radial baling chambers, knives mounted between said baling chambers, and means for producing relative rotary movement between said hopper and baling chambers.

11. A baling machine having a feed hopper, a plurality of radial baling chambers, means for producing relative rotary movement between said baling chambers and feed hopper, knives mounted between said baling chambers, and mechanism for feeding material from said feed hopper to said baling chambers.

12. A baling machine having a feed hopper, a plurality of radial baling chambers, knives mounted between said baling chambers, means for producing relative rotary movement between said baling chambers and feed hopper, mechanism mounted in said feed hopper for feeding material to said baling chambers, and automatically controlled twisting and cutting mechanism connected with each of said baling chambers.

13. A baling machine having a feed hopper, a plurality of radial baling chambers, means for producing relative rotary movement between said baling chambers and feed hopper, knives mounted between said baling chambers, a slotted turret eccentrically mounted in said feed hopper, rotary feed arms eccentrically mounted in said turret and adapted to project through the slots thereof, twisting and cutting mechanism for each of said baling chambers comprising a vertically-movable supporting frame, an operating shaft connected with the supporting frame, a roller loosely mounted on the operating shaft, a supporting track connected with the feed hopper and adapted to support said roller, a descending switch connected with said supporting track, a descending track, an ascending switch and an ascending track, an operating gear wheel on the operating shaft of said twisting and cutting mechanism, an annular rack connected with the feed hopper below the supporting track and adapted to be engaged by said operating gear, a twisting device on the vertically-movable supporting frame consisting of a plurality of twisting disks having oppositely-disposed peripheral notches, means for rotating said twisting disks from said gear wheel on said operating shaft, a gear wheel mounted between said twisting disks and having peripheral notches corresponding with the notches of the disks, a deflector, a volute guide for feeding the wires inwardly with respect to the periphery of said twisting disks, a cutter mounted adjacent the center of the volute guide, controlling mechanism for automatically throwing the twisting and cutting mechanism into operation, said controlling mechanism consisting of a pin wheel adapted to contact with the moving material in the baling chamber, a controlling disk rotated by the pin wheel and having a socket, a longitudinally movable bar having a finger bearing against said controlling disk, a roller carried by the inner end of said bar, a descending switch lever adapted to contact with the inner end of said bar for opening the descending switch, a projection carried by said feed hopper for engaging said bar and throwing the same outwardly, a cam member carried by said bar, and a pin on said controlling disk adapted to be engaged by said cam member.

14. A baling machine having tying and cutting mechanism provided with a volute guide having a cutter adjacent the center thereof.

15. A baling machine having a feed hopper, a baling chamber radiating therefrom, means for producing relative rotary movement between said hopper and baling chamber, band twisting mechanism mounted on said baling chamber and adapted to be projected into and cross the same, a circular rack secured to the feed hopper, and a driving gear adapted to operate the band twisting mechanism when brought into engagement with said rack when said mechanism enters the baling chamber.

16. A baling machine having a feed hopper, a baling chamber radiating therefrom, means for producing relative rotary movement between said hopper and baling chamber, band twisting mechanism mounted on said baling chamber and adapted to be passed into and across the same, a circular rack attached to said feed hopper, means carried by the hopper for causing the descent of the band twisting mechanism, and a driving gear connected to said band twisting mechanism and adapted to operate the same when brought into engagement with said circular rack by the twisting mechanism.

In testimony that I claim the foregoing as my own, I have hereto affixed my signature in the presence of two witnesses.

WILLIAM SILOUS BRYAN.

Witnesses:
WHITE DARNALL,
W. E. HOOKER.